United States Patent
Teeni et al.

(10) Patent No.: US 9,544,773 B2
(45) Date of Patent: Jan. 10, 2017

(54) SYSTEM AND METHOD FOR ENFORCING COMMUNICATION POLICIES

(71) Applicants: Benjamin Teeni, Tel Aviv (IL); Gil Israeli, Tel Aviv (IL)

(72) Inventors: Benjamin Teeni, Tel Aviv (IL); Gil Israeli, Tel Aviv (IL)

(*) Notice: Subject to any disclaimer, the term of this patent is extended or adjusted under 35 U.S.C. 154(b) by 0 days.

(21) Appl. No.: 14/650,345

(22) PCT Filed: Dec. 9, 2013

(86) PCT No.: PCT/IL2013/051012
§ 371 (c)(1),
(2) Date: Jun. 8, 2015

(87) PCT Pub. No.: WO2014/087411
PCT Pub. Date: Jun. 12, 2014

(65) Prior Publication Data
US 2015/0312766 A1    Oct. 29, 2015

Related U.S. Application Data

(60) Provisional application No. 61/735,017, filed on Dec. 9, 2012.

(51) Int. Cl.
| | |
|---|---|
| H04W 12/08 | (2009.01) |
| H04W 4/04 | (2009.01) |
| H04W 12/12 | (2009.01) |
| H04W 24/02 | (2009.01) |
| H04W 60/00 | (2009.01) |
| H04L 29/08 | (2006.01) |
| H04L 29/06 | (2006.01) |
| H04W 88/08 | (2009.01) |

(52) U.S. Cl.
CPC ............ *H04W 12/08* (2013.01); *H04W 4/043* (2013.01); *H04W 12/12* (2013.01); *H04W 24/02* (2013.01); *H04W 60/00* (2013.01); *H04L 63/1425* (2013.01); *H04L 67/12* (2013.01); *H04L 2463/121* (2013.01); *H04W 88/08* (2013.01)

(58) Field of Classification Search
CPC ...... H04W 12/08; H04W 60/00; H04W 24/02; H04W 12/12; H04W 4/043; H04W 88/08; H04W 4/04; H04L 63/1425; H04L 2463/121; H04L 67/12
See application file for complete search history.

(56) References Cited

U.S. PATENT DOCUMENTS

| | | | |
|---|---|---|---|
| 6,230,017 B1 * | 5/2001 | Andersson | H04W 4/24 |
| | | | 455/433 |
| 2006/0172740 A1 | 8/2006 | Kyriakides et al. | |
| 2010/0197324 A1 | 8/2010 | Bolin et al. | |

FOREIGN PATENT DOCUMENTS

| | | | | |
|---|---|---|---|---|
| BR | WO 03019907 A2 * | 3/2003 | ............. | H04W 4/04 |
| WO | 03019907 A2 | 3/2003 | | |

* cited by examiner

*Primary Examiner* — Chuong A Ngo
(74) *Attorney, Agent, or Firm* — Soroker Agmon Nordman

(57) ABSTRACT

The subject matter discloses an apparatus, comprises a managed access unit for regulating wireless communication in a facility by providing communication services to devices located in the facility according to a predefined usage policy pertaining to devices transmitting from the facility; a wireless signal monitoring system for detecting wireless communication transmitted from devices in the facility; a bypass detector for comparing the data received from the wireless signal monitoring system with expected wireless signals based on the predefined usage policy and activity of the managed access unit to determine whether there is a bypass of the managed access unit.

23 Claims, 2 Drawing Sheets

SYSTEM AND METHOD FOR ENFORCING COMMUNICATION POLICIES

FIELD OF THE INVENTION

The subject matter relates generally to managed communication services in a facility and more specifically to a system and method for managing communication services provided to wireless devices in a facility.

BACKGROUND OF THE INVENTION

As the use of cellular phones and communications increases, organizations and other entities need to prevent or control the use of such phones. For example, many correctional facilities or sensitive compartmented information facilities (SCIFs) such as military installations and other campuses need to prevent persons from communicating with the outside world with devices that are not sanctioned or monitored by the facility. In such scenarios the entity seeking to prevent the use of the cellular device(s) would typically need to choose one of the following approaches: 1. Jamming—preventing the device from communicating with the base station. This approach prevents legitimate devices from communicating with the base station and does not distinguish legitimate devices from non-legitimate devices. 2. Detection—detecting which device communicates with the base station. This approach fails to prevent the non-legitimate device from communicating with another device outside the facility. The facility is defined in space.

Selective connectivity of cellular phones can be achieved using a managed access system that utilizes a base station (or a plurality of base stations) that attract(s) the cellular devices in the facility as the most attractive base station in the area. Once the phone registers onto the access base station, core parameters from the phone, which uniquely identify it, are acquired and used by a management system which controls the behavior and services provided to each device, allow or provide selective service to legitimate devices and prevent service from the non-legitimate devices. The base station can deny service from the legitimate devices and send them to another base station, while keeping the non-legitimate devices at the virtual base station. Alternatively, the base station can provide services to the legitimate devices by connecting the legitimate device to the public network. Such location based policy enforcement can be provided by a third party base station or by base station of the mobile operator.

While the managed access system offers a breakthrough in terms of selective connectivity there are methods that could be used to force the device to register with a specific/commercial base station, thus bypassing the managed access system.

SUMMARY

The subject matter discloses an apparatus, comprises: a managed access unit for regulating wireless communication in a facility by providing communication services to devices located in the facility according to a predefined usage policy pertaining to devices transmitting from the facility; a wireless signal monitoring system for detecting wireless communication transmitted from devices in the facility; a bypass detector for comparing the data received from the wireless signal monitoring system with expected wireless signals based on the predefined usage policy and activity of the managed access unit to determine whether there is a bypass of the managed access unit.

The bypass of the managed access unit is defined by a transmission of a signal by a device located in the facility, wherein said transmission does not conform to the predefined usage policy. In some cases, the bypass detector receives a plurality of parameters associated with wireless signals transmitted from the facility from the wireless signal monitoring system and uses the plurality of parameters to determine bypass of the managed access unit.

In some cases, the plurality of parameters are received from the wireless signal monitoring system according to communication attributes of a device in the facility that transmitted the detected wireless communication. In some cases, the plurality of parameters comprises timestamp of the signal. In some cases, the bypass detector compares a timestamp of signals associated with devices selected from a group of legitimate devices with timestamps of signals from a specific device to determine whether the specific device is selected from a group of non-legitimate devices or the group of legitimate devices. In some cases, the plurality of parameters comprises communication channel of the signal. In some cases, the plurality of parameters comprises synchronization timing of the signal. In some cases, the plurality of parameters comprises such as ID of the device, or location of the device from which the monitored signal was transmitted.

In some cases, the bypass detector compares time the channel or sync timing or parameters of signals associated with the predefined usage policy with time channel or synchronization timing of uplink signals from a specific device to determine whether the signal conforms to the predefined usage policy.

In some cases, the bypass detector communicates with a storage device, such that indications from the wireless signal monitoring system are compared to data within the storage device to determine bypass of the managed access unit.

In some cases, the managed access unit comprises a specific base station for communicating with cellular devices in the facility. In some cases, the wireless signal monitoring system provides the bypass detector with an indication of use of a cellular uplink frequency in the facility. In some cases, the bypass detector comprises a query generation unit for generating queries to the managed access unit upon receiving indications from the wireless signal monitoring system.

In some cases, the bypass detector correlates between a list of devices sending an uplink wireless signal as provided by the wireless signal monitoring system and a group of legitimate devices defined by the predefined usage policy and the operation of the managed access unit.

In some cases, the bypass detector comprises an alert generator for generating an alert is when detecting an uplink signal from a device selected from a group of non-legitimate devices. In some cases, the bypass detector comprises a storage for storing the data received from the wireless signal monitoring system. In some cases, the bypass detector comprises a storage the storing data related to the predefined usage policy. In some cases, the wireless signal monitoring system comprises a deciphering module for deciphering uplink signals that conform to the predefined policy.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to s be exemplary and not necessarily limiting. Corresponding or like elements are optionally designated by the same numerals or letters.

DETAILED DESCRIPTION

The subject matter discloses a system and method for detecting bypassing of a managed access system as described above. The managed access system keeps a communication policy, and allows transmission of wireless signals from the facility according to that policy. For example, the policy may define lists of legitimate devices and non-legitimate devices, and the managed access system provides or allows network services to the legitimate devices only. The managed access system may keep only the list of legitimate devices and define all the devices outside the list as non-legitimate devices. In some other cases, policy is defined by allowing network services to all devices, but only at specific times of the day, or with a predefined list of allowed destinations, or to prevent network services from the devices to specific destinations, or based upon geographic filters. The policy may prevent transmission of email messages, or email messages larger than a predefined size, or email messages with images or documents, such as WORD documents. The system comprises a wireless detector that monitors uplink signals transmitted from a device in a facility defined in space. The system comprises a bypass detector that compares data related to uplink signals as received from the wireless detector with the list of legitimate devices to determine whether a specific wireless signal is associated with a group of legitimate devices or not.

The subject matter also discloses using the detection of a bypass of the managed access unit to prevent transmission of the bypassing signal. For example, the system may also comprise a jammer to transmit a signal or series of signals that would prevent/interfere with the communication between the bypassing signal and the non-managed base-station for access point) or by transmitting an alert signal to a 3-rd party system (such as the operator of the system providing service to the bypassing device) to terminate the communication/service with the bypassing signal.

Figure 1:
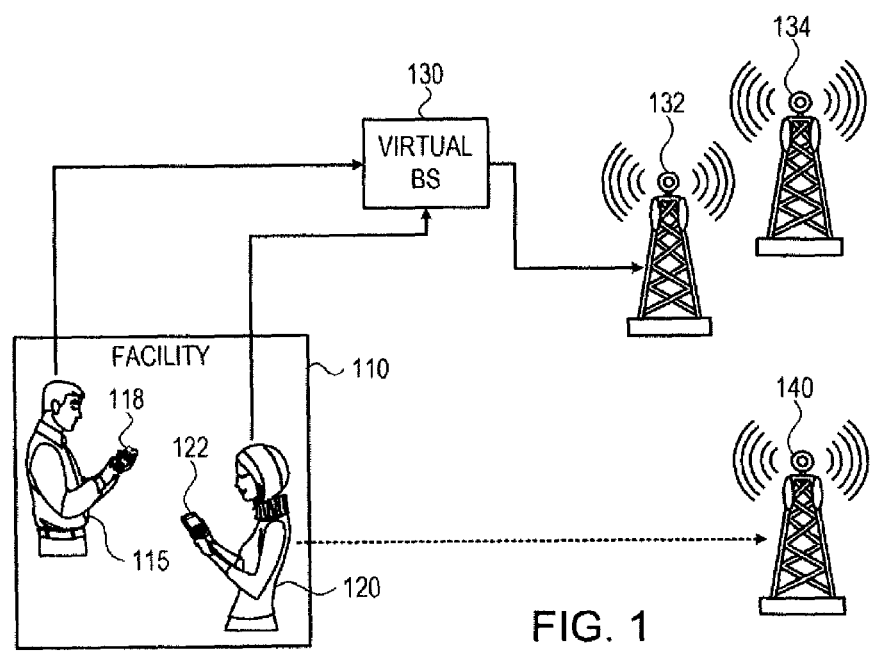
FIG. 1 shows a communication environment in the area of a facility, according to some exemplary embodiments of the subject matter.

FIG. 1 shows a communication environment in the area of a facility, according to some exemplary embodiments of the subject matter. The facility 110 may be a building such as a prison or an office within a building, a yard, a military base, a factory, mining plant and the like. A managed access system keeps a list of devices that are allowed to communicate from the facility 110, for example only managers of the office, also referred to as a list of legitimate devices. Devices that are not part of the list of legitimate devices are included in a list of non-legitimate devices or are defined as non-legitimate Ad-Hoc.

The managed access system attracts mobile devices that transmit wirelessly from the facility 110, such a mobile devices 118, 122, for example via a virtual base station 130. The virtual base station 130 provides network services to legitimate devices and prevents network services from non-legitimate devices. The virtual base station 130 may deny services from legitimate devices, thus forcing the legitimate devices to request service from other base stations 132, 134, or provide the legitimate devices network services via the other base stations 132, 134.

The mobile device 118 is associated with a first person 115 and the mobile device 122 is associated with a second person 120. In some exemplary cases, the mobile device 118 is on the list of legitimate devices and the mobile device 122 is not on the list of legitimate devices, which makes the mobile device a non-legitimate device. The second person 120 may use a software application on the mobile device 122 which allows the second person 120 to select a specific base station 140, without regard to the virtual base station 130 operating according to the set of rules of the managed access system. Thus, the non-legitimate mobile device 122 receives network services from the specific base station 140, which is the technical problem of the disclosed subject matter.

Figure 2:
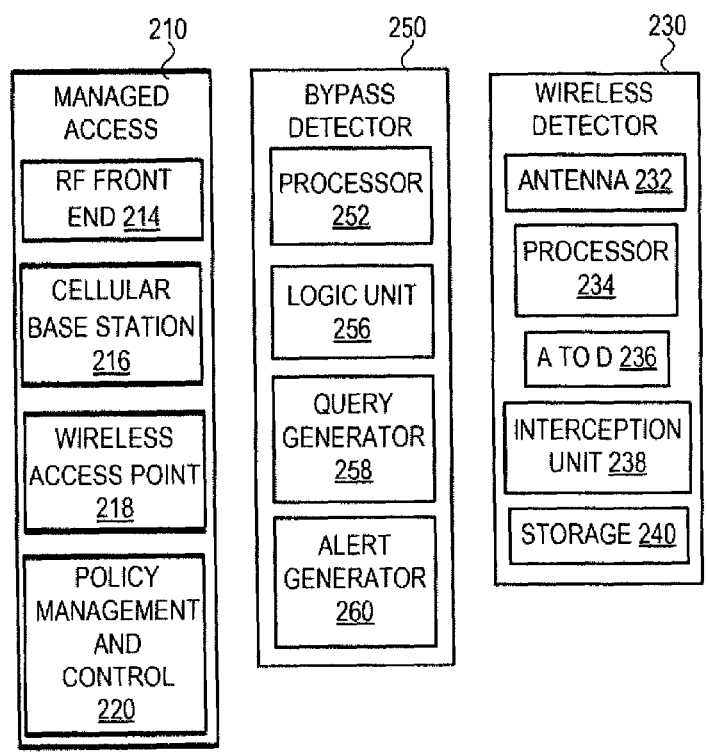
FIG. 2 shows a system for detecting bypassing of a managed access system, according to exemplary embodiments of the disclosed subject matter.

FIG. 2 shows a system for detecting bypassing of a managed access system, according to exemplary embodiments of the disclosed subject matter. The system for detecting bypassing of a managed access system comprises three main modules—a managed access unit 210, a wireless signal monitoring system 230 and a bypass detector 250. The bypass detector 250 may reside in the managed access unit 210 or in the wireless signal monitoring system 230 or be configured as an independent unit. The bypass detector 250 extracts data from the managed access unit 210 and the wireless signal monitoring system 230 to determine whether a non-legitimate device bypasses the managed access unit 210 or not.

The bypass detector 250 may receive data regarding any uplink communication or downlink from the wireless signal monitoring system 230 and send a query to the managed access unit 210 to see if the monitored signal conforms to the policy of the managed access unit 210 or not. The data regarding the monitored signal from the facility may be a channel allocated to the mobile device in case communication is performed on a 20 protocol or any SIM identifier, such as IMSI or TMSI in case communication is performed on a 30 protocol.

The managed access unit 210 comprises a Cellular Base Station (BTS) 216. The managed access unit 210 comprises Wireless Access Point (WAP) 218 for providing access to communication/data services to devices in its proximity. The managed access unit 210 comprises an RF front end 214 that propagates the downlink signals from the base station to devices and receive the uplink signals from the devices (for the base station). RF front end 214 may comprise communication units such as RF antennas, amplifiers, combiners and the like.

The managed access unit 210 comprises a managed access policy management and control unit 220—this is the "brain" that both makes the BTS and the WAP perform as devices that holds and enforce, a policy, for example by granting or denying services based on the predefined usage policy as well as interfacing with other systems—such as the bypass detector 250. Communication between the bypass detector 250 and the managed access unit 210 may be performed wirelessly or via cables or via the Internet. The predefined usage policy of the managed access unit 210 defines expected wireless signals to be transmitted from the facility.

The wireless signal monitoring system 230 comprises an antenna 232 via which the wireless signals transmitted from wireless devices in the facility are detected at the wireless signal monitoring system 230. The wireless signal monitoring system 230, also referred to as a wireless detector 230, may also comprise an analog to digital converter 236 which converts the analog signals detected by the antenna 232 into digital data to be transmitted to the bypass unit 250. The wireless detector 230 may also include a processor 234 for processing the digital data converted by the analog to digital converter 236. The processor may filter the digital data and transmit to the bypass unit 250 only data that is relevant to the detection of bypassing of the managed access unit 210. For example, in case the antenna 232 receives a 2G signal, the processor 234 might only send an indication regarding communication channel number or frequency band to the bypass detector unit 250. In case the antenna 232 detects a 3G signal, the processor 234 may send identifying number of the SIM card (IMSI or TMSI) and timing information to the bypass unit 250. The processor 234 may filter the digital data according to a set of rules stored in a storage device 240. The storage device 240 may also log data and metadata about signals detected by the wireless detector 230 for additional review, for example in case the detected signal is of a mobile device that was determined as legitimate the day before, the processor 234 may not send any relevant data to the bypass unit 250. The relevant data transmitted to the bypass unit 250 may include timestamp)start and stop) identifying the time frame in which a transmission by a legitimately transmitting devices can be expected to transmit at a given frequency. In an alternative embodiment, the bypass unit 250 may store a list of prohibited or legitimate transmissions. The list may include data relevant to channels, frequency and timestamps. The wireless detector may also comprise a deciphering module for deciphering uplink signals that conform to the predefined policy.

The wireless detector 230 may include a module that performs mathematical techniques such as FFT (Fast Fourier Transformation) to create and maintain continuous stream of data reporting the frequency, time and power of detected transmissions in the area of coverage and could also include other information derive from the received signal such as s time synchronization data (detection information).

The bypass unit 250 also comprises a pre-processing unit 252 for processing data received from the wireless detector 230 and the manage access system 210. The pre-processing unit 252 translates data from the wireless detector 230 to a data format required by the logic unit 256. The processor 252 thus converts or manipulates the data received from the wireless detector 230 in a manner that is appropriate for the logic unit 256 or for the managed access unit 210.

The bypass unit 250 may also comprise a logic unit 256 for determining whether the signals detected by the wireless detector 230 are associated with a group of legitimate devices or associated with a group of non-legitimate devices. The logic unit 256 may use a set of is predefined rules, or store the list of legitimate devices. The logic unit 256 may perform any kind of comparison or correlation between data regarding detected signals as provided by the wireless detector 230 and data regarding legitimate or non-legitimate devices, as provided by the managed access unit 210.

The bypass unit 250 may also comprise a query generation unit 258. The query generation unit generates queries to be transmitted to the managed access unit 210, for example whether a specific mobile device is associated with a group of legitimate devices or a group of non-legitimate devices. The query generation unit 258 may also generate queries regarding frequencies allowed by the managed access unit 210, in case such frequencies are detected as having uplink signals detected by the wireless detector 230.

The bypass unit 250 may also comprise an alert generator 260. The alert generator 260 is configured to generate an alert about a device bypassing the managed access unit 210.

In some exemplary cases, the bypass unit 250 cross-references the list, of legitimately transmitting cellular devices and their parameters with the information provided by the wireless detector 230 about frequencies in use. The list of legitimately transmitting mobile devices may be stored at the bypass unit 250 or at the managed access unit 210. For each frequency in use, the bypass unit 250 verifies if the use of the frequency can be expected/explained based on the data in the list of legitimately transmitting cellular devices. For example, if a specific cellular device is bypassing the managed access unit 210 using a frequency/communication channel allocated by a Commercial base station (BTS), the transmission of the specific cellular device will be reported by the wireless detector 230 (including the transmission frequency). The bypass unit 250 searches the list of the legitimately transmitting devices and finds that the base station of the managed access unit 210 has not allocated/allowed the use of this frequency/channel to a device under its control (at the time of the transmission). In this case the bypass unit 250 infers that such transmission represents a bypass of the BTS of the managed access unit 210 and generates an alert.

In case of the use of 3G/UMTS devices and if mobile devices of the group of legitimate devices are provided service by the BTS of the managed access unit 210, the bypass detection unit 250 would use a plurality of parameters such as the specific time that to that the transmission started or information such as synchronization timing of the signal to infer whether a detected transmission is associated to a legitimate device or whether they represent a bypass of the managed access unit 210.

One example of operation of the system of the present invention is a case in which device A is legitimate and device B is not, and that device B attempts to bypass the managed access unit 210 while device A is communicating through the managed access unit 210. The managed access system 210 reports the precise synchronization (timing) of the communication session between itself and device A. The wireless detector 230 can identify the specific (separate) signals of device A and device B (without associating them to the specific devices), based on their cyclo-stationary timing characteristics. Since the transmission of device A will match (in terms of synchronization) the report of the managed access unit 210, it will be deemed as legitimate. At the same time the synchronization information of the signal of device B will not match the information reported by the managed access unit 210 and the bypass detector 250 will thus infer that the signal associated with device B represents a bypass of the system.

The combination of the managed access unit 210 with a wireless detector 230 and bypass unit 250 enables the overall solution to deliver the advantages of the Managed Access approach whilst addressing the risk of unauthorized phone users bypassing the managed access unit 210.

Figure 3:
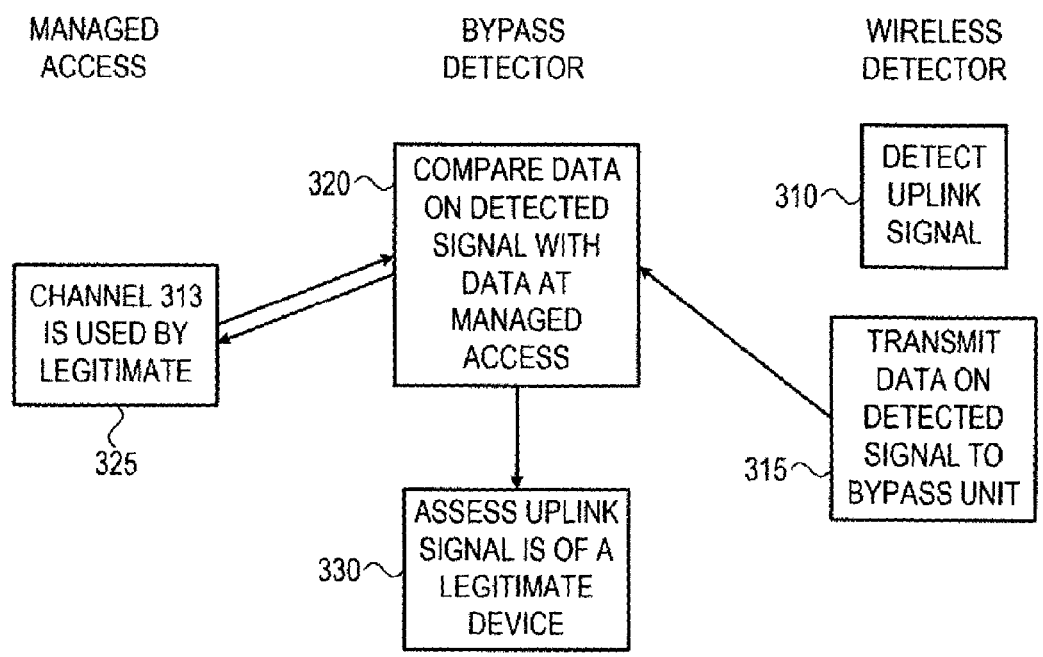
FIG. 3 shows a method fir detecting bypassing of a managed access system, according to exemplary embodiments of the disclosed subject matter.

FIG. 3 shows a method for detecting bypassing of a managed access system, according to exemplary embodiments of the disclosed subject matter. Step 310 discloses detecting an uplink signal transmitted by a mobile device located within a facility. The uplink signal may be transmitted to a base station, or to any form of intermediate station between the sender and destination device. Detecting the uplink signal may also include detecting data that characterizes the uplink signal, such as channel number, ID of the mobile device, destination of the uplink signal, synchronization timing, fixed or temporary ID of the SIM card used by the mobile device, physical location of the transmitter and the like.

Step 315 discloses transmitting the data on the detected signal to the bypass unit 250. in some exemplary cases, the detected data on the uplink signal is processed at the wireless detector 230 before transmitted to the bypass unit 250, for example using an autocorrelation performed on the signal to extract the signals synchronization rate and timing Step 320 discloses comparing the data regarding the detected uplink signal with data concerning legitimate or non-legitimate devices. The data concerning legitimate or non-legitimate devices may be stored in the bypass unit 250 or in the managed access unit 210. In some exemplary cases, the comparison is performed alter the bypass unit 250 generates a query to the managed access unit 210 as to the legitimacy of the detected uplink channel by the wireless detector 230. Step 325 discloses sending a response to the query to the bypass unit 250. In step 330 the bypass unit assesses whether the detected uplink signal is of a legitimate device or of a non-legitimate device.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

The invention claimed is:

1. An apparatus for managing transmissions of wireless communication devices, comprising:
   a managed access unit for regulating wireless communication in a facility by providing communication services to devices located in the facility according to a predefined usage policy pertaining to devices transmitting from the facility, said managed access unit comprising a managed base station;
   a wireless signal monitoring system for detecting wireless communication signals transmitted from devices located within the facility;
   a bypass detector for comparing the wireless signals detected by the wireless signal monitoring system with expected wireless signals based on the predefined usage policy, to determine whether there is a bypass of the managed access unit, wherein said bypass includes a transmission of a wireless signal by a device in the facility to a non-managed base station; and,
   an alert generator configured to generate an alert when a bypass of the managed access unit is determined.

2. The apparatus of claim I. wherein the bypass detector receives a plurality of parameters associated with wireless signals transmitted from the facility from the wireless signal monitoring system and uses the plurality of parameters to determine bypass of the managed access unit.

3. The apparatus of claim 2, wherein a plurality of parameters are received from the wireless signal monitoring system according to communication attributes of the device in the facility that transmitted the detected wireless communication signals.

4. The apparatus of claim 3, wherein the plurality of parameters comprises such as ID of the device, or location of the device from which the monitored signal was transmitted.

5. The apparatus of claim 4, wherein the bypass detector compares time the channel or sync timing or parameters of signals associated with the predefined usage policy with time channel or synchronization timing of uplink signals from a specific device to determine whether the signal conforms to the predefined usage policy.

6. The apparatus of claim 2, wherein the plurality of parameters comprises a timestamp of the signal.

7. The apparatus of claim 6, wherein the bypass detector compares a timestamp of signals associated with devices selected from a group of legitimate devices with timestamps of signals from a specific device to determine whether the specific device is selected from a group of non-legitimate devices or the group of legitimate devices.

8. The apparatus of claim 2, wherein the plurality of parameters comprises communication channel of the signal.

9. The apparatus of claim 2, wherein the plurality of parameters comprises synchronization timing of the signal.

10. The apparatus of claim 1, wherein the bypass detector communicates with a storage device, such that indications from the wireless signal monitoring system are compared to data within the storage device to determine bypass of the managed access unit.

11. The apparatus of claim 1, wherein the wireless signal monitoring system provides the bypass detector with an indication of use of a cellular uplink frequency in the facility.

12. The apparatus of claim 1, wherein the bypass detector comprises a query generation unit for generating queries to the managed access unit upon receiving indications from the wireless signal monitoring system.

13. The apparatus of claim 1, wherein the bypass detector correlates between a list of devices sending an uplink wireless signal as provided by the wireless signal monitoring system and a group of legitimate devices defined by the predefined usage policy and the operation of the managed access unit.

14. The apparatus of claim 1, wherein the alert generator is further configured to generate an alert when detecting an uplink signal from a device selected from a group of non-legitimate devices.

15. The apparatus of claim 1, wherein the bypass detector comprises a storage for storing the data received from the wireless signal monitoring system.

16. The apparatus of claim 1, wherein the bypass detector comprises a storage for storing data related to the predefined usage policy.

17. The apparatus of claim 1, wherein the wireless signal monitoring system comprises a deciphering module for deciphering uplink signals.

18. The apparatus of claim 1, further comprising a logic unit for determining whether signals detected, by the wireless signal monitoring system are associated with a group of legitimate devices or with a group of non-legitimate devices, based on a set of predefined rules, wherein a legitimate device conforms to the predefined usage policy and is allowed by the managed access unit to transmit wirelessly from the facility through the managed base station.

19. The apparatus of claim 18, wherein a non-legitimate device does not conform to the predefined usage policy and is prohibited by the managed access unit from transmitting wirelessly from the facility through the managed base station.

20. The apparatus of claim 19, wherein the managed access unit denies communication services for devices in the facility that transmit a signal which does not conform to the predefined usage policy.

21. The apparatus of claim 18, wherein the managed access unit is configured to store a list of legitimately transmitting devices, wherein the list includes a transmission frequency used by each device.

22. The apparatus of claim 1, further comprising a logic unit for determining whether signals detected by the wireless signal monitoring system are associated with a group of legitimate devices or with a group of non-legitimate devices, based on a set of predefined rules, wherein a legitimate device conforms to the predefined usage policy and is allowed by the managed access unit to transmit wirelessly from the facility through the non-managed base station.

23. The apparatus of claim 1, further comprising, a jauntier to jam communication attempting to bypass of the managed access unit is determined.

* * * * *